United States Patent [19]
Martin

[11] 3,908,534
[45] Sept. 30, 1975

[54] FRYING PAN HEAT TRANSFER PLATE

[76] Inventor: Denzil O. Martin, 16222 Monterey Ln., Space No. 83, Huntington Beach, Calif. 92649

[22] Filed: June 28, 1972

[21] Appl. No.: 267,128

[52] U.S. Cl. .................................. 99/418; 99/415
[51] Int. Cl.² ......................................... A47J 37/10
[58] Field of Search ............. 99/418, 403, 415, 422, 99/423, 424, 425

[56] References Cited
UNITED STATES PATENTS

| | | | |
|---|---|---|---|
| 754,310 | 3/1904 | Horine | 99/425 UX |
| 1,070,476 | 8/1913 | Hunholz | 99/416 X |
| 1,356,432 | 10/1920 | Eidt | 99/418 |
| 1,453,054 | 4/1923 | Nordstrom | 99/418 |
| 1,976,616 | 10/1934 | Kinnicutt | 99/418 |
| 3,427,957 | 2/1969 | O'Reilly | 99/425 X |

FOREIGN PATENTS OR APPLICATIONS

| | | | |
|---|---|---|---|
| 67,975 | 6/1943 | Norway | 99/410 |
| 1,237 | 11/1877 | Germany | 99/422 |
| 256,073 | 12/1927 | Italy | 99/418 |

*Primary Examiner*—Peter Feldman
*Assistant Examiner*—Arthur O. Henderson
*Attorney, Agent, or Firm*—Bernard Kriegel

[57] ABSTRACT

Heat transfer plate, which is imperforate, and preferably of circular form and made of one piece, having a plurality of integral radially positioned ribs depending from the bottom of the plate, and terminating short of the outer periphery of the plate and short of the center of the plate, such plate adapted to be placed in a frying pan or skillet with the ribs resting on the frying pan bottom, so as to provide a substantial area of contact for the purpose of transferring heat from the bottom of the frying pan or skillet to the upper or top surface of the plate, on which food such as bacon or hamburger is placed, the plate being made of a suitable heat conductive material, such as aluminum or an alloy thereof.

10 Claims, 6 Drawing Figures

U.S. Patent  Sept. 30,1975  3,908,534
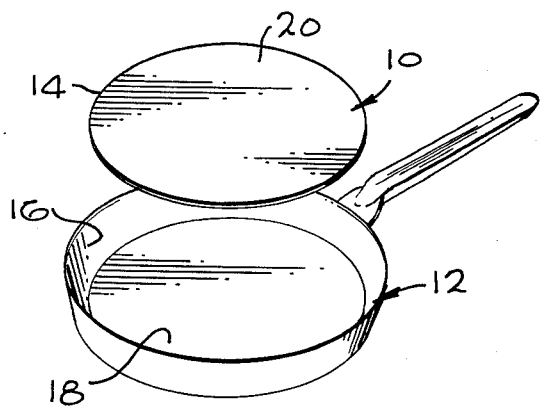
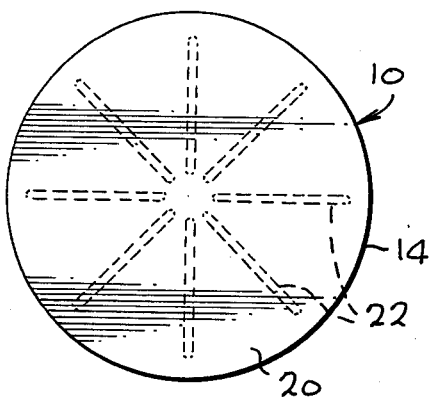
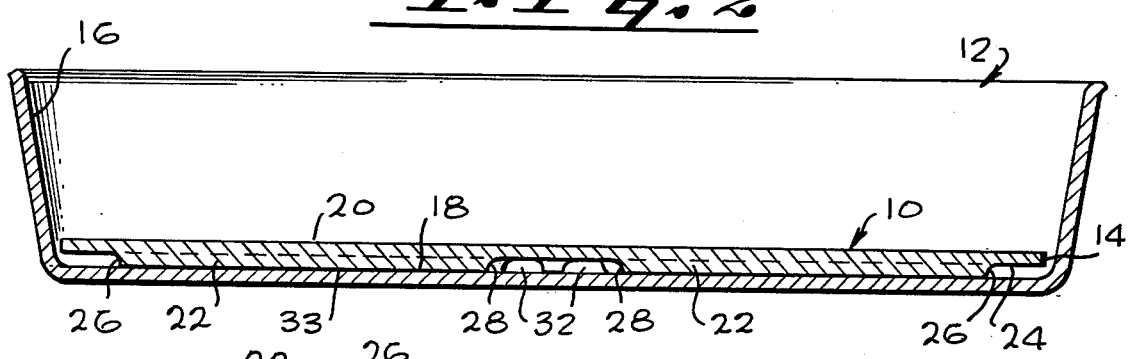
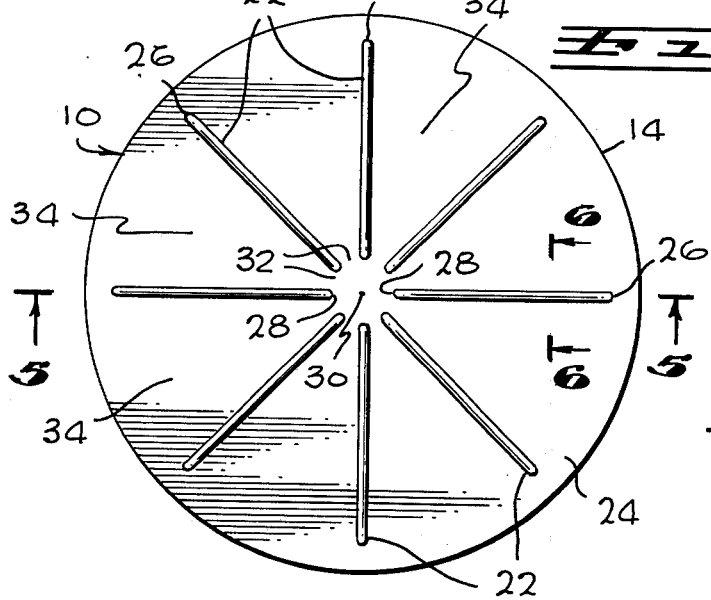
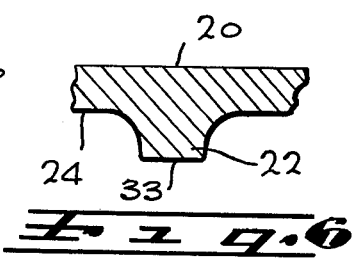
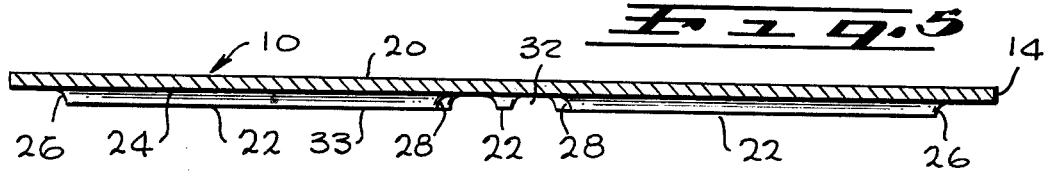

FRYING PAN HEAT TRANSFER PLATE

This invention relates to a heat transfer plate for use in a frying pan or skillet, and is particularly concerned with the provision of a simple and inexpensive heat transfer plate which can be placed in a frying pan or skillet and which efficiently transfers heat from the frying pan to the plate for rapid frying of food thereon, while permitting fat and grease formed during such operation to be readily drained from the surface of the plate during the frying or cooking operation, and into the bottom of the frying pan, out of contact with the food being fried on the plate.

Various types of plates or false bottoms for a cooking vessel such as a frying pan have been developed in the prior art. Thus, for example, U.S. Pat. No. 717,655 discloses a metal frusto-conical plate positioned in a cooking vessel to prevent overcooking or burning the food placed therein. Corrugated, radially extending grooves provide openings at the periphery of the plate to allow fluid to circulate or drippings to collect. U.S. Pat. No. 1,453,054 shows a false bottom for a cooking utensil comprising a plate made of aluminum which has supporting legs which are stamped or punched out of the metal plate, and which elevate the main portion of the plate above the bottom of the cooking utensil. The plate is provided with a plurality of perforations. This perforated false bottom construction is designed so that when placed in a cooking utensil, the false bottom or plate can be supported at a distance from the bottom of the utensil, so that the article of food being cooked thereon will be held out of contact with the bottom, avoiding possibility of the article being burned or scorched, and affording means for free circulation of the liquid in the vessel. However, the false bottom disclosed in this patent provides only a relatively small area of heat transfer through the legs struck from the plate, as well as uneven cooking of the food placed on the top of the plate, because of the many interruptions provided by the perforations.

U.S. Pat. Nos. 1,356,432, 1,617,120, and 1,621,967 are also illustrative of various constructions of prior art utensils or plates which are designed to be placed in cooking vessels such as a frying pan to prevent burning of food placed therein. These prior art constructions have various disadvantages including inefficient heat transfer from the bottom of the cooking utensil such as the frying pan, to the auxiliary plate, the inclusion of perforations having the disadvantage noted above, inefficient draining of grease or other liquids formed during cooking of the food and difficulty in cleaning such plates, particularly with respect to perforated plates.

The chief object of the present invention accordingly is the provision of a simple integral, that is one piece, heat transfer plate which is designed to be placed in and to rest on the bottom of a utensil, particularly a frying pan or skillet, and so constructed as to produce a very rapid heat transfer from the bottom of the frying pan to the plate, and also to provide efficient drainage of excess fat or grease produced during frying or broiling of food on the plate, and to form a reservoir in the pan and beneath the plate, to which such excess fat or grease can be drained.

These objects are accomplished according to the present invention by the provision of a preferably circular plate, e.g. of aluminum, having a plurality of radially arranged ribs depending from the bottom thereof so that when the plate is placed, for example, in a frying pan, the radial ribs rest on the frying pan bottom, supporting the plate above the bottom of the frying pan and providing a substantial area of contact for transferring heat from the bottom of the frying pan to the upper or top surface of the plate, on which food, such as bacon, hamburger, or other food is placed.

The plate is imperforate and fat from the food dains by gravity automatically from the top of the plate around its perimeter and into the bottom of the pan into a reservoir in the pan beneath the plate and between the radial ribs. This avoids the necessity for continually draining excess fat or grease during the cooking operation. The heat transfer plate according to the present invention provides more rapid cooking as compared to prior art methods of cooking, and the heat transfer plate hereof, because of its imperforate nature and the provision of only a plurality of ribs attached to its undersurface, can be readily cleaned.

The invention will be more clearly understood by reference to the description below of a preferred embodiment, taken in connection with the accompanying drawing, it being understood that such embodiment is to be taken merely as illustrative of the invention and not in limitation thereof.

In the drawing:

FIG. 1 is an exploded view of the heat transfer plate of the invention, for placement in a frying pan or skillet;

FIG. 2 is a vertical section of the heat transfer plate of the invention, resting on the bottom of the frying pan;

FIG. 3 is a top plan view of the heat transfer plate shown in FIGS. 1 and 2;

FIG. 4 is a bottom plan view of the heat transfer plate of FIG. 3, showing the radial ribs attached to the bottom of the plate;

FIG. 5 is a section taken on line 5—5 of FIG. 4; and

FIG. 6 is a sectional view of a radial rib, taken on line 6—6 of FIG. 4.

Referring to the drawings, numeral 10 indicates a heat transfer plate according to the invention, adapted and designed to be placed in the bottom of a skillet or frying pan, indicated at 12. The plate 10 is imperforate and of circular form and of a diameter which permits the plate to fit into the frying pan, with the outer periphery 14 of the plate 10 disposed closely adjacent, but out of contact with the inner surface 16 of the frying pan, when the plate 10 rests on the bottom 18 of the frying pan, as illustrated in FIG. 2.

The heat transfer plate 10 is formed of a suitable heat conductive metal, preferably aluminum or an aluminum-copper alloy, and can be in the form of a casting, the upper surface or top 20 of the plate being flat or substantially planar, and continuous, and provided with a plurality, here indicted as eight in number, of radially arranged ribs 22 of substantially equal length integrally cast on and depending substantially normal to, the flat bottom surface 24 of the plate 10, as illustrated in FIG. 6. The ribs 22 are of substantially rectangular cross section, but can taper from the top downwardly to a narrower width of cross section at the bottom portion of the ribs, as indicated in FIG. 6. It will be noted that the ribs 22 are equally angularly spaced from each other and extend outwardly to a position where the outer ends 26 of the ribs terminate short of but near the perimeter 14 of the plate, and inwardly to a position where the inner ends 28 of the ribs terminate short of the axis 30 of the plate, and hence forming a central space 32 between the inner ends 28 of the ribs.

The bottoms 33 of the elongated ribs 22 lie in a plane parallel to the surfaces 20 and 24 of plate 10, and rest on the bottom 18 of the pan, thereby supporting the plate above the bottom of the pan. Such ribs provide a large area of heat transfer from the bottom 18 of the pan 12 to the plate 10, through the radial ribs, but without interfering with the ability of fat, grease and the like to flow off the top surface 20 of the imperforate plate 10, around its perimeter 14, and into the bottom of the pan. The inner spaces 34 between the ribs, and the central space 32 adjacent the inner ends of the ribs, permit freedom of flow of fat or grease from around the perimeter 14 of the plate and across the bottom 18 of the pan 12. As the depth of fat or grease which is collected in the spaces 34 and 32 increases, the rate of heat transfer also increases. Since the ribs 22 are evenly or equally spaced angularly with respect to each other, the heat transferred or conducted from the pan by the ribs is distributed iniformly over the entire surface of plate 10.

It is seen that the improved flat imperforate heat transfer plate, with the radially arranged ribs connected to the bottom surface thereof provides a large surface area of contact between such radial ribs and the bottom of the frying pan or other utensil, so as to increase considerably the heat conductivity to the upper surface of the plate, while at the same time permitting and facilitating drainage by gravity of grease and the like around the perimeter of the plate and into the bottom of the pan. It is noted that the flat continuous upper plate surface 20, with only the elongated ribs connected to the bottom surface thereof, is much easier to clean, for example, as compared with the many perforations found in auxiliary plate structures of the prior art, such as that of above-noted U.S. Pat. No. 1,453,054.

It will be understood of course that the number of radial ribs provided on the bottom surface of the heat transfer plate can be varied from the eight ribs illustrated in FIG. 4, for example six or ten of such equally angularly spaced ribs can be employed. Further, it will be understood that the cross-sectional shape of the radial ribs can be varied as desired.

Also, it will be understood that the heat transfer plate of the invention can be other than circular, for example square or rectangular, and arranged or designed to fit into a cooking vessel of corresponding shape, such as square or rectangular. Particularly where the heat transfer plate is square or rectangular, the length of the respective elongated radial ribs can also be varied, as desired, to obtain even and rapid heat transfer to the entire surface of the plate.

I claim:

1. A heat transfer plate adapted for use in a frying pan, or the like, comprising an imperforate metal plate having high heat conductivity and having a flat top surface extending to its outer periphery and a bottom surface, a plurality of radially disposed ribs integral with and depending from said bottom surface, said bottom surface being flat between said ribs, the lowermost surfaces of all of said ribs being equidistant from said bottom surface of said plate throughout the lengths of said ribs, whereby all of said ribs are adapted to rest on the bottom of said pan, said ribs extending outwardly to a position such that the outer ends of said ribs are adjaent to the outer periphery of said plate, and extending inwardly to a position such that the inner ends of said ribs are disposed short of the axis of said plate, said heat transfer plate being devoid of any portions projecting below said lowermost surfaces.

2. A heat transfer plate as defined in claim 1, said plate being a circular plate.

3. A heat transfer plate as defined in claim 2, said radially disposed ribs being substantially equally spaced angularly from each other, and said radial ribs being of substantially equal length.

4. A heat transfer plate as defined in claim 1, said radially disposed ribs being substantially equally spaced angularly from each other.

5. A heat transfer plate as defined in claim 1, said ribs having a substantially rectangular cross section.

6. A heat transfer plate as defined in claim 1, the bottom surfaces of said ribs being in a plane substantially parallel to sid plate surfaces.

7. A heat transfer plate as defined in claim 1, said plate being composed of aluminum or an alloy of aluminum.

8. A heat transfer plate as defined in claim 1, said flat top surface being continuous over its entire area, the outer ends of said ribs terminating short of the outer periphery of said plate.

9. In combination with a frying pan having a bottom and a side wall, an imperforate metal plate having high heat conductivity and having a flat top surface extending to its outer periphery and a bottom surface, a plurality of radially disposed ribs integral with and depending from said bottom surface, said bottom surface being flat between said ribs, the lowermost surfaces of all of said ribs being equidistant from said bottom surface of said plate throughout the lengths of said ribs, whereby said lowermost surfaces rest on the bottom of said frying pan, said ribs extending outwardly to a position such that the outer ends of said ribs are adjacent to the outer periphery of said plate and extending inwardly to a position such that the inner ends of said ribs are disposed short of the axis of said plate, the periphery of said plate being disposed closely adjacent to but spaced from the interior surface of the side wall of said pan, permitting fat and grease to flow by gravity off the top surface of said plate around its outer periphery and into the bottom of said pan in the spaces between adjacent ribs of said plate, and in the central space between said inner ends of said ribs.

10. In the combination as defined in claim 9, said frying pan being circular and said plate being a circular plate, said radially disposed ribs of sid plate being substantially equally spaced angularly from each other.

* * * * *